United States Patent [19]
Ezzell et al.

[11] Patent Number: 6,074,709
[45] Date of Patent: *Jun. 13, 2000

[54] POLYIMIDE ANGULARITY ENHANCEMENT LAYER

[75] Inventors: Stephen A. Ezzell, Woodbury; Hassan Sahouani, Hastings; Ernest M. Thurber, Woodbury, all of Minn.

[73] Assignee: 3M Innovative Properties Company, Saint Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/072,908

[22] Filed: May 5, 1998

Related U.S. Application Data

[62] Division of application No. 08/652,886, May 23, 1996, Pat. No. 5,750,641.

[51] Int. Cl.[7] .................................................. G02F 1/1335
[52] U.S. Cl. .............................................. 428/1.3; 428/1.27
[58] Field of Search .............................. 428/1, 1.27, 1.3; 349/117–121

[56] References Cited

U.S. PATENT DOCUMENTS

| | | | |
|---|---|---|---|
| 4,845,185 | 7/1989 | Teramoto et al. | 518/229 |
| 4,897,092 | 1/1990 | Burgoyne, Jr. et al. | 55/16 |
| 5,055,616 | 10/1991 | Burgoyne, Jr. et al. | 564/322 |
| 5,196,953 | 3/1993 | Yeh et al. | 359/73 |
| 5,344,916 | 9/1994 | Harris et al. | 528/353 |
| 5,480,964 | 1/1996 | Harris et al. | 528/353 |
| 5,612,450 | 3/1997 | Mizushima et al. | 428/1 |

FOREIGN PATENT DOCUMENTS

| | | |
|---|---|---|
| 2650829 | 8/1989 | France . |
| 62292836 | 8/1989 | Japan . |
| 63-295633 | 8/1989 | Japan . |
| 5-31341 | 7/1991 | Japan . |

OTHER PUBLICATIONS

Langsam et al., "Effects of Diamine Monomer Structure on the Gas Permeability of Polyimide, I. Bridged Diamines," *Journal of Polymer Science,* Part A, vol. 31, p. 909–921 (Dec. 1993).

*Primary Examiner*—Alexander Thomas
*Attorney, Agent, or Firm*—Lorraine R. Sherman; Philip Y. Dahl

[57] ABSTRACT

An angularity enhancement layer in a liquid crystal display, which display comprises a liquid crystal cell, wherein the angularity enhancement layer includes a negative birefringent polyimide layer comprising a plurality of structural units having pendant fluorene groups, said angularity enhancement layer being disposed on at least one surface of said liquid crystal cell. A liquid crystal display can comprise an angularity enhancement construction of the invention which comprises a polyimide layer.

1 Claim, 1 Drawing Sheet ations ≤ 6,074,709

POLYIMIDE ANGULARITY ENHANCEMENT LAYER

This is a divisional of application Ser. No. 08/652,886 filed May 23, 1996 now U.S. Pat. No. 5,750,641.

FIELD OF THE INVENTION

This invention relates to polyimide angularity enhancement layers in liquid crystal displays which enhance the viewing angle of liquid crystal displays. Novel polyimide copolymers are disclosed. Also, multilayer angularity enhancement constructions comprising polyimides are disclosed.

BACKGROUND OF THE INVENTION

Negative birefringent films greatly enhance the image quality of liquid crystal displays viewed at off-normal angles by compensating for image degradation due to "natural" net positive birefringence of the liquid crystal materials. Typically, negative birefringent films have been prepared by precision stretching of polymer films or by precisely controlled vapor deposition of thin ceramic layers. However, practicioners have found that precise control of film stretching in order to exactly control the resulting birefringence is difficult, and that ceramic films can be unstable and are not practical for large surface areas.

Non-stretched negative birefringent polyimide films are known. U.S. Pat. No. 5,344,916 describes polyimide films prepared from benzene dianhydrides and/or bis(benzene) dianhydrides and monoaromatic and/or polyaromatic diamines. While the polyimides are generally soluble, some polyimides are soluble only in solvents that are incompatible with certain useful liquid crystal polymeric substrates onto which the polyimides could be coated. The monoaromatic and/or polyaromatic diamines are linked benzeneamine compounds (benzidine derivatives, bis(4-aminophenyl) methane derivatives, 2,2-bis(4-aminophenyl)propane derivatives, and the like) rather than polyaromatic diamines such as 9,9-bis(4-aminophenyl)fluorenes. Many linked benzeneamines must be handled with care due to their suspected human toxicity.

Homopolymers of 9,9-bis(4-aminophenyl)fluorenes and aromatic dicarboxylic acid dianhydrides are known. U.S. Pat. No. 4,897,092 describes the preparation and properties of polyimide membranes prepared from the homopolymers, the membranes being useful for gas separations. The membranes are described as being approximately ten times the thickness of layers useful in liquid crystal displays, and optical properties of the membranes are not elucidated. No copolymers of 9,9-bis(4-aminophenyl)fluorenes and aromatic dicarboxylic acid dianhydrides with a non-fluorenyl aromatic diamines are described. French patent application number 2,650,829 discloses a number of possible uses for homopolymers of 9,9-bis(4-aminophenyl)fluorenes and aromatic dicarboxylic acid dianhydrides, including alignment films for liquid crystal displays. No copolymers with additional non-fluorenyl aromatic diamines are described, and no indication of optical compensation properties of the films is presented. Copolymers of 9,9-bis(4-aminophenyl)fluorenes with two or more aromatic dicarboxylic acid dianhydrides are described in U.S. Pat. No. 4,845,185 and in Japanese patent application number 62292836 (Derwent abstract). Polyimides described in U.S. Pat. No. 4,845,185 are shown to be solvent soluble and to have high heat resistance, but are only moderately light transmissive. Copolymers of 9,9-bis (4-aminophenyl)fluorene, an aromatic tetracarboxylic acid dianhydride and an aliphatic diamine are disclosed in Japanese patent application number JP 63295633. Polyimides described therein are said to have good thermal resistance and workability, and find use as electric or electronic materials (Derwent abstract), but no optical proper ties are described.

Japanese patent application 5-31341 discloses a polyimide gas separation membrane which is a copolymer of 9,9-bis(4-aminophenyl)fluorene and aromatic dicarboxylic acid dianhydride with a non-fluorenyl polycyclic fused ring aromatic diamine. No optical properties of these copolymers are disclosed.

SUMMARY OF THE INVENTION

Briefly, this invention provides a negatively birefringent angularity enhancement layer in a liquid crystal display, which display comprises a liquid crystal cell, wherein the negatively birefringent angularity enhancement layer comprises a polyimide comprising a plurality of pendant fluorene structural units and preferably is disposed on at least one surface of the liquid crystal cell.

In another aspect, the invention provides a liquid crystal display comprising in sequence a first polarizer, a liquid crystal cell, and a second polarizer, and, disposed between said liquid crystal cell and at least one of said polarizers, an angularity enhancement construction comprising a colorless, optically-transparent negatively birefringent polyimide layer comprising the reaction product of a 9,9-bis (aminoaryl)fluorene and at least one aromatic tetracarboxylic acid dianhydride, and optionally one or more aromatic diamines. Preferably, the aromatic diamine has one six membered ring, more preferably it is a benzene diamine. Preferably, the polyimide layers exhibit an out-of-plane birefringence value of from about −0.001 to about −0.2, preferably −0.001 to about −0.04.

In yet another aspect, the present invention provides a multilayer angularity enhancement construction comprising an optically transparent, optically isotropic substrate having on at least one surface thereof at least one layer of a polyimide, preferably the total thickness of the polyimide layer or layers being greater than or equal to about 1 μm and/or the polyimide layer exhibiting an optical retardation of at least 25 nm; on the surface of the at least one polyimide layer, there is disposed one or more layers of optical adhesive; and, as the outermost layer(s) of the construction, on the adhesive is a layer that acts as both release liner for the optical adhesive and as a protective layer for the construction. See FIG. 1. Preferably, the optically transparent, optically isotropic substrate is a polymer; most preferably, the substrate is poly(methyl methacrylate), PMMA.

In a further aspect there are provided novel copolymeric polyimides comprising the copolymerization product of a 9,9-bis(aminoaryl)fluorene, at least one aromatic tetracarboxylic acid dianhydride, and an aromatic diamine free of fused rings.

In this application:

"alk" as in "alkyl" and "alkoxy" means an aliphatic group or moiety having from 1 to about 20 carbon atoms;

"aryl" means an aromatic group or moiety having from 6 to about 20 carbon atoms;

"group" means the specified moiety or any group containing the specified moiety (as by substitution or extension) that does not adversely affect the composition;

"layer" means a coating on a substrate or a self-supporting film;

"film" means a generally thin, flexible self-supporting material;

"retardation" means the multiplication product of the refractive anisotropy and the film thickness, which is a physical quantity that equals the phase difference of light as it passes through the film; this value changes with the viewing angle; and "water-white" means colorless and having a light transmission in excess of 90% in the wavelength range from 400 to 700 nm.

Polyimide films of the invention, based upon 9,9-bis (aminoaryl)fluorenes, exhibit advantageous optical properties and certain processing advantages based upon the three-dimensional structure of the polymer from which they are formed. Both physical and optical properties of the films can be tailored by appropriate selection of monomers, and it is desirable to strike a balance between them. To be useful in a liquid crystal display, films should be essentially colorless and, to be easily coated in thin layers, the polymer should be soluble in common, high-volatility solvents, i.e., appears to the naked eye to be a homogenous solution. In polyimides, these two factors are usually detrimental to increased negative birefrigence, so a balance must be found.

This invention provides a novel angularity enhancement layer in a liquid crystal display comprising a liquid crystal cell, wherein the angularity enhancement layer is negatively birefringent and comprises a polyimide having a plurality of pendant fluorene structural units. When coated or cast as films, polyimides useful in the invention present an in-plane molecular orientation, which gives the film anisotropic optical properties.

Polyimides of the invention have high negative birefringence, in the range of −0.001 to −0.2, preferably −0.001 to 0.04, more preferably −0.001 to −0.032, enabling them to be used as thin coatings, preferably 10 micrometers or less, in a liquid crystal display. Such a thin coating can be a layer on a flexible medium. Liquid crystal displays desirably are flexible and are very thin in order to reduce their overall weight. Thin layers of polyimides of the invention can be optically transparent and they can be water-white, slightly yellow, or yellow. Preferably, they are water-white.

DETAILED DESCRIPTION OF THE PREFERRED EMBODIMENTS OF THE INVENTION

Figure 1:
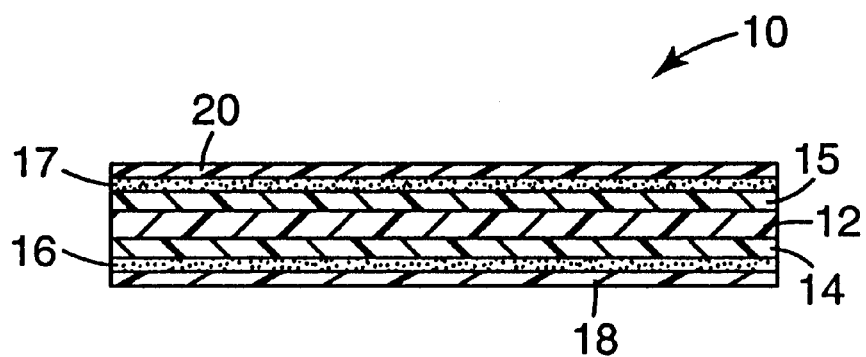
FIG. 1 represents a cross-sectional view of a multilayer angularity enhancement construction of the invention, which construction is suitable for use in a liquid crystal display.

In one embodiment, a polyimide angularity enhancement layer of the invention is prepared by coating from solvent a polymer comprising the condensation polymerization product of a 9,9-bis(aminoaryl)fluorene with an aromatic tetracarboxylic acid dianhydride, the polymer having one or more repeating units corresponding to Formula I:

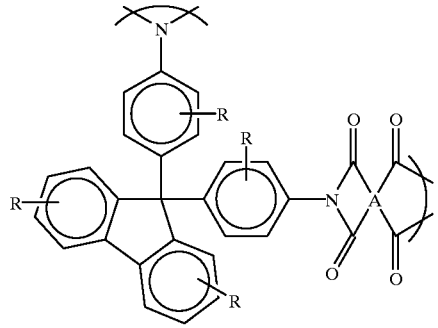

wherein
  each R independently can be from 0 to 4 substituents selected from the group consisting of hydrogen, halogen, phenyl, phenyl group substituted by 1 to 4 halogen atoms or alkyl groups having 1 to 10 carbon atoms, and an alkyl group having from 1 to 10 carbon atoms; preferably R is selected from halogen, phenyl, phenyl group substituted by 1 to 4 halogen atoms or alkyl groups having 1 to 10 carbon atoms, and an alkyl group having from 1 to 10 carbon atoms as substituents;
  A can be a tetrasubstituted aromatic group having from 6 to 20 carbon atoms; preferably A is a (1) pyromellitic group, (2) a polycyclic aromatic group such as naphthylene, fluorenylene, benzofluorenylene, anthracenylene, and substituted derivatives thereof, wherein the substituted groups can be alkyl having 1 to 10 carbon atoms and fluorinated derivatives thereof, and halogen such as F or Cl, and (3) moieties of Formula II:

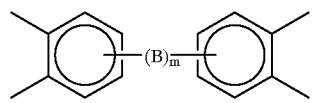

wherein B can be a covalent bond, a $CR(^2)_2$ group, a CO group, an O atom, an S atom, and $SO_2$ group, a $Si(C_2H_5)_2$ group or an $N(R^3)_2$ group, and combinations thereof, wherein m can be an integer of 1 to 10; each $R^2$ independently can be H or $C(R^4)_3$; each $R^3$ independently can be H, an alkyl group having from 1 to about 20 carbon atoms, or an aryl group having from about 6 to about 20 carbon atoms; and each $R^4$ independently can be H, fluorine, or chlorine.

In a further aspect, there are provided novel copolymeric polyimides comprising the copolymerization product of a 9,9-bis(aminoaryl)fluorene (as described above), at least one aromatic tetracarboxylic acid dianhydride (as described above) and an aromatic diamine free of fused rings, the aromatic diamine preferably having general Formula III:

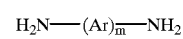

wherein m is as previously defined and Ar is as defined below, to prepare a polymer having the repeating unit of Formula IV, below:

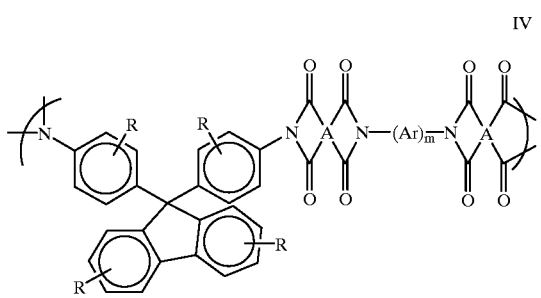
IV wherein R, A, and m are as described above, and
Ar represents a monocyclic or polycyclic aromatic group having from 6 to 20 carbon atoms which can be selected from the group consisting of phenylene, naphthylene, fluorenylene, benzofluorenylene, anthracenylene, and substituted derivatives thereof, wherein the substituted groups can be alkyl having 1 to 10 carbon atoms and fluorinated derivatives thereof, and halogen such as F or Cl; and moieties of Formula V:

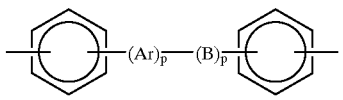
V wherein Ar and B can have the meaning described above, and each p independently can be an integer 0 to 10.

More particularly, the polyimides useful in the present invention comprise a plurality of pendant fluorene structural units, wherein a layer of the polyimide exhibits angularity enhancement properties and further exhibits a retardation (δ) of at least 25 nm, wherein retardation is calculated as shown in Formula VI:

$$\delta = 2\pi d / \lambda [n_x / n_z (n_z^2 - \sin^2\Phi)^{1/2} - (n_y^2 - \sin^2\Phi)^{1/2}]$$  VI wherein
d represents the thickness of the layer;
λ represents the wavelength of light used to measure retardation;
$n_z$ represents the refractive index of the layer measured perpendicular to the plane of the layer;
$n_x$ and $n_y$ are the same and represent the refractive index of the layer measured parallel to the plane of the layer; and
Φ represents the angle of light incidence with respect to the normal.

Preferably, angularity enhancement layers of the invention exhibit off-normal retardation of at least about 25 nm, most preferably at least about 50 nm. It is understood that retardation values are actually negative numbers, although we refer to values for retardation in absolute numbers, as is conventional in the liquid crystal art. When used in, for instance, a liquid crystal display, angularity enhancement layers of the invention exhibit a thickness of at least about 1 micrometer, preferably in the range of 1 to 50 micrometers.

Preferably, polyimides of the invention have a number average molecular weight in the range of about 20,000 to about 140,000 as measured by GPC (polystyrene standards).

Polyimides useful in angularity enhancement layers of the invention are derived from 9,9-bis(aminoaryl)fluorenes by reaction with an aromatic tetracarboxylic acid dianhydride at room temperature in a polar aprotic solvent such as N,N-dimethylacetamide (DMAC) to form a polyamic acid. Optionally, at least one additional aromatic diamine may be present to form a copolyamic acid. Cyclic dehydration of the (co)polyamic acid in the presence of, for example, acetic anhydride and pyridine at an elevated temperature of, for example, about 90 to 110° C. for about one to three hours, produces the polyimides which are soluble in common organic solvents.

More particularly, 9,9-bis(aminoaryl)fluorenes useful in producing angularity enhancement layers of the invention can be prepared by methods described in U.S. Pat. No. 4,684,678, the teachings of which are incorporated herein by reference. In general, they are prepared by double alkylation of fluorenones by the desired aminoaryl compound by procedures known in the art. Fluorene aromatic rings can be substituted with from 0 to 4 substituting groups per aromatic ring. Substituting groups can be selected from the group consisting of linear, branched or cyclic alkyl groups of from 1 to about 20 carbon atoms; linear, branched or cyclic alkoxy groups of from 1 to about 20 carbon atoms; aryl, aralkyl and alkaryl groups of from 6 to about 20 carbon atoms; carboxylic acid esters of linear, branched or cyclic alcohols having from 1 to about 20 carbon atoms; linear, branched or cyclic thioethers having from 1 to about 20 carbon atoms; and groups such as Cl, Br, F, $NO_2$, CN, tri(alkyl)silyl, acetyl, and the like, so long as the substituting group is inert in polyimide formation. Preferably, fluorenyl aromatic rings are unsubstituted.

Aminoaryl groups of 9,9-bis(aminoaryl)fluorenes refers to groups comprising aromatic rings bearing at least one primary amine group. Aromatic groups can be monocyclic or polycyclic and can have from 6 to about 20 carbon atoms. Preferably, the aromatic groups are monocyclic, more preferably phenyl, and are attached to the fluorene nucleus at aromatic ring positions para to the primary amine group. Either or both of the aminoaryl rings may optionally be substituted as described above for aromatic rings of the fluorene nucleus, providing that any substitution does not interfere with reactivity of the primary amine groups in polymer formation. In particular, either or both of the aminoaryl rings may be substituted with from 0 to 4 linear, branched or cyclic alkyl groups, halogen, or phenyl. Preferably, both rings may be substituted with 1 or 2 linear or branched alkyl groups having from 1 to 3 carbon atoms, such substitution being at any of ring positions 2, 3, 5, or 6, preferably at ring positions 3 or 5 or a combination thereof. More preferably, both aminoaryl rings can be substituted with 1 or 2 methyl or ethyl groups. Most preferably, 9,9-bis(aminoaryl)fluorenes useful in angularity enhancement layers of the invention include 9,9-bis(4-aminophenyl) fluorene, 9,9-bis(3-methyl-4-aminophenyl)fluorene, 9,9-bis (3,5-diethyl-4-aminophenyl)fluorene, and 9,9-bis(3-ethyl-5-methyl-4-aminophenyl)fluorene.

Aromatic tetracarboxylic acid dianhydride compounds useful in the preparation of angularity enhancement constructions of the invention are those represented by Formula VII,

VII

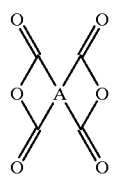

wherein A has the meaning defined above.

Representative useful dianhydrides include pyromellitic dianhydride, 3,6-diphenylpyromellitic dianhydride, 3,6-bis(trifluoromethyl)pyromellitic dianhydride, 3,6-bis(methyl)pyromellitic dianhydride, 3,6-diiodopyromellitic dianhydride, 3,6-dibromopyromellitic dianhydride, 3,6-dichloropyromellitic dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-biphenyltetracarboxylic acid dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)propane dianhydride, 2,2'-bis(3,4-dicarboxyphenyl)hexafluoropropane dianhydride (6FDA), bis(3,4-dicarboxyphenyl)ether dianhydride, 4,4'-oxydi(phthalic anhydride), 3,3',4,4'-diphenylsulfonetetracarboxylic acid dianhydride, 4,4'-[4,4'-isopropylidene-di(p-phenyleneoxy)]-bis(phthalic anhydride), N,N-(3,4-dicarboxyphenyl)-N-methylamine dianhydride, bis(3,4-dicarboxyphenyl)diethylsilane dianhydride, naphthalene tetracarboxylic acid dianhydrides such as 2,3,6,7- and 1,2,5,6-naphthalenetetracarboxylic acid dianhydrides, 2,6-dichloronaphthalene-1,4,5,8-tetracarboxylic acid dianhydride, and heterocyclic aromatic tetracarboxylic acid dianhydrides such as thiophene-2,3,4,5-tetracarboxylic acid dianhydride, pyrazine-2,3,5,6-tetracarboxylic acid dianhydride, and pyridine-2,3,5,6-tetracarboxylic acid dianhydride.

Angularity enhancement layers of the invention comprise polyimides prepared by polymerization of a 9,9-bis(aminoaryl)fluorene, an aromatic tetracarboxylic acid dianhydride (both of which have been described in detail above) and preferably an additional, optional, aromatic diamine of the general formula $H_2N—(Ar)_m—NH_2$, wherein Ar and m have the meanings as previously described.

Preferred optional diamines include benzene diamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Other useful polyaromatic diamines in the invention include 4,4'-diaminobiphenyl, 4,4'-diaminodiphenylmethane, 2,2-bis(4-aminophenyl)propane 2,2-bis(4-aminophenyl)-1,1,1,3,3,3-hexafluoropropane, 4,4'-diaminodiphenyl ether, 3,4-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl,4,4'-bis(3-aminophenoxy)biphenyl, 2,2-bis{4-(4-aminophenoxy)phenyl}propane, 2,2-bis{4-(4-aminophenoxy)phenyl}propane, 2,2-bis {4-(4-aminophenoxy)phenyl}-1,1,1,3,3,3-hexafluoropropane, 4,4'-diaminodiphenyl thioether, 4,4'-diaminodiphenyl sulfone, 2,2'-diaminobenzophenone, and 3,3'-diaminobenzophenone; naphthalene diamines such as 1,8- and 1,5-diaminonaphthalene; or heterocyclic aromatic diamines such as 2,6-diaminopyridine, 2,4-diaminopyrimidine, and 2,4-diamino-s-triazine.

More preferred optional aromatic diamines are p-phenylenediamine and alkyl substituted p-phenylenediamines, including 2-methyl(p-phenylenediamine), 2,5-dimethyl(p-phenylenediamine), 2-ethyl(p-phenylenediamine), 2,5-diethyl(p-phenylenediamine), and combinations thereof.

Novel compositions of matter that are copolyimides are included in this invention. The copolyimides comprise the reaction product of a 9,9-bis(aminoaryl)fluorene, an aromatic tetracarboxylic acid dianhydride, and an additional aromatic diamine that is free of fused rings (all of which monomers have been described above).

Solvents that can be used as the reaction medium for polyimide preparation and in which polyimides of the invention are soluble include polar aprotic solvents such as N,N-dimethylacetamide, N-methylpyrolidinone and N,N-dimethylformamide. After isolation and, as appropriate, purification, polyimides preferably are soluble in and coatable from a wide variety of common solvents, including, but not limited to, methyl ethyl ketone (MEK), cyclohexanone, dioxane, toluene, and propylene glycol methyl ether acetate. When coated on a substrate or cast as self-supporting films, the polyimides provide colorless or near-colorless layers exhibiting negative birefringence of from about −0.001 to about −0.2, resulting in retardations of at least 25 nm, preferably from about 25 nm to 700 nm. Particularly useful are low boiling solvents because they tend to evaporate before any degradation of the substrate can take place.

Substrates suitable for supporting a layer of any of the polyimides of the invention can be glass or plastics such as polymethylmethacrylate and other optically isotropic polymer films. Other substrates useful in the invention include anisotropic polymers (such as polycarbonate) and anisotropic ceramics.

A solution of the polyimide can be cast or it can be coated as a layer upon a suitable substrate. When used as a layer for angularity enhancement in a liquid crystal display the polyimide can be coated on one or both sides of a liquid crystal cell or on the inner surface of one or both of the polarizers. The polyimide layer can be coated on a stretched biaxially oriented polymer film such as polycarbonate, polystyrene, polyester, or poly(methylmethacrylate).

Polyimide films possess an in-plane orientation due to the inherently rigid, linear structure of the polyimide repeating unit. In solution, polyimides (or their precursor polyamic acids) can be random coil polymers, lacking any orientation. When these polymers are solution-coated a spontaneous ordering of the molecules can occur as solvent is removed. This ordering is two-dimensional in the X, Y plane of the film. The polyimide properties differ in the Z versus the X, Y directions. This results in a negatively birefringent film.

Polyimides of the invention have a plurality of fluorene groups attached orthogonally to the polymer backbone. This provides a large, polarizable site for interactions with solvents. Additionally, the steric bulk and geometry of the fluorene component disrupts chain packing. This enhances the ability of solvents to interact with the polymer chain. This steric effect also disrupts the formation of charge-transfer complexes, resulting in colorless or light yellow materials.

In the present invention, copolymerization is employed to provide a polyimide having the desired characteristics of solubility, lack of color or light color, and negative birefringence. 9,9-Bis(4-aminophenyl)fluorenes have been copolymerized with monomers having more structural linearity, in order to maximize the in-plane orientation and the birefringence of the layer. Generally, incorporation of a more linear monomer (9,9-bis(4-aminophenyl)fluorenes introduce a mainchain kink due to their quaternary carbon atoms) can be useful to "straighten out" the polymer chain as much as possible in order to increase negative birefringence of the polymer layer. The practical limit of this is the point where solubility and lack of color are compromised by incorporation of too much of a rigid, linear comonomer. The copolymer composition must be balanced in order to obtain soluble, colorless or lightly colored polyimides with the maximum negative birefringence possible.

In general, copolymers of the invention are significantly more soluble in ketone solvents and cyclic ether solvents (desirable processing solvents) than related homopolymers.

Polyimides useful in the construction of the invention preferably comprise the reaction product of approximately equimolar amounts (i.e., 1:1 molar ratio, or approximately 50 mol percent each) of aromatic tetracarboxylic acid dianhydride and aromatic diamine. Variation in copolymer composition can be used effectively to control polymer properties such as birefringence, color, and solubility to prepare polyimides useful in angularity enhancement constructions. When more than one dianhydride is used, each dianhydride can be present in an amount from about 1 to about 49 mol percent of the total reactants, such that the total mol percent of dianhydride is preferably 50 mol percent and at most 51 mol percent. Likewise, when more than one diamine is used, each diamine can be present in from about I to about 49 mol percent of the total reactants, such that the total mol percent of diamine is preferably 50 mol percent, and at most 51 mol percent.

Polyimides useful in the invention may also comprise monofunctional monomers in the polymerizable composition that can act as end-capping agents to control (or limit) the molecular weight of the polyimide polymer. Monofunctional monomers useful as end-capping agents can include aromatic primary amines and aromatic dicarboxylic acid anhydrides.

Aromatic primary amines useful as end-capping agents can be selected from the group consisting of aniline and aniline derivatives having one or more substituents on the aromatic ring. Substitutents include alkyl groups having from I to about 20 carbon atoms, aryl groups having from 6 to about 20 carbon atoms, alkaryl groups having from 6 to about 20 carbon atoms, aralkyl groups having from 6 to about 20 carbon atoms, fluorine, chlorine, bromine, iodine, alkoxy groups having from 1 to about 20 carbon atoms, and other common organic substituents, so long as they do not interfere in polymer formation or subsequent processing of the resulting polyimide.

Aromatic dicarboxylic acid anhydrides useful as end-capping agents can be selected from the group consisting of benzene dicarboxylic acid anhydrides, substituted benzene dicarboxylic acid anhydrides, naphthalene dicarboxylic acid anhydrides, substituted naphthalene dicarboxylic acid anhydrides, and related higher aromatic homolog dicarboxylic acid anhydrides. Examples of aromatic dicarboxylic acid anhydrides include phthalic anhydride which can be substituted with alkyl groups having from 1 to about 20 carbon atoms, aryl groups having from 6 to about 20 carbon atoms, alkaryl groups having from 6 to about 20 carbon atoms, aralkyl groups having from 6 to about 20 carbon atoms, fluorine, chlorine, bromine, iodine, alkoxy groups having from 1 to about 20 carbon atoms, and other common organic substituents, so long as they do not interfere in polymer formation or subsequent processing of the resulting polyimide; 1,2-naphthalene dicarboxylic acid anhydride, 2,3-naphthalene dicarboxylic acid anhydride, 3,4-naphthalene dicarboxylic acid anhydride, any of which naphthalene dicarboxylic acids can be substituted with alkyl groups having from 1 to about 20 carbon atoms, aryl groups having from 6 to about 20 carbon atoms, alkaryl groups having from 6 to about 20 carbon atoms, aralkyl groups having from 6 to about 20 carbon atoms, fluorine, chlorine, bromine, iodine, alkoxy groups having from 1 to about 20 carbon atoms, and other common organic substituents, so long as they do not interfere in polymer formation or subsequent processing of the resulting polyimide.

When present, end-capping agents can comprise up to about 1 mol % of the total polymer composition such that the overall molar ratio of anhydride to amine remains essentially 1:1.

Preferably, end-capping agents useful in the invention are solids at about 23° C. (approximately room temperature), for ease of handling.

Preferred compositions of the invention comprise the reaction product of about 50 mol percent of a single dianhydride and about 50 mol percent of a mixture of aromatic amines. More preferably, compositions of the invention comprise about 50 mol percent 2,2'-bis-(3,4-dicarboxyphenyl)hexafluoropropane dianhydride (6FDA) and about 50 mol percent of a mixture of 9,9-bis(3-methyl-4-aminophenyl)fluorene (OTBAF) and a derivative of p-phenylenediamine. Most preferably, compositions of the invention comprise about 50 mol percent 6FDA, about 25 mol percent OTBAF, and about 25 mol percent of at least one of p-phenylenediamine and 2,5-dimethyl-p-phenylenediamine.

FIG. 1 shows a cross-sectional view of a multilayer angularity enhancement construction 10 of the invention. A central substrate 12 is coated on at least one side with at least one polyimide layer 14 and/or 15 comprising a polyimide as described above. Central substrate 12 comprises any optically clear, preferably optically isotropic sheet material. Preferably, central substrate 12 is one of polymeric material and glass, more preferably polymeric material such as poly(methyl methacrylate), cellulose triacetate, a polyolefin or a polycarbonate, and most preferably poly(methyl methacrylate). Preferably, central substrate 12 may have a thickness of from about 25 to about 100 μm, more preferably from about 70 to about 80 μm, most preferably about 75 μm. When two polyimide layers 14 and 15 are present, each may have a thickness of from about 1 to about 25 μm, more preferably from about 5 to about 10 μm, and most preferably about 6 μm, such that the total thickness of polyimide present in angularity enhancement construction 10 may be from about 2 to about 50 μm, more preferably from about 10 to about 20 μm, and most preferably about 12 μm. When only one polyimide layer is present (14 or 15), the total thickness of the layer may be from about 1 to about 50 μm, more preferably from about 10 to about 20 μm, and most preferably about 12 μm. If the total thickness of polyimide layers 14 plus 15 is less than about 1 μm, angularity enhancement construction 10 may not exhibit sufficient retardation to be effective in a liquid crystal display. If the total thickness of polyimide layers 14 plus 15 is greater than about 50 μm, angularity enhancement construction 10 will be too thick to be used in state-of-the-art liquid crystal displays. Immediately outwardly adjacent to polyimide layer 14 is optical adhesive layer 16. Optionally, a second optical adhesive layer 17 may be disposed outwardly adjacent to polyimide layer 15, if it is present. Alternatively, if polyimide layer 15 is not present, optional optical adhesive layer 17 may be disposed on the surface of central substrate 12 on the side opposite polyimide layer 14 and optical adhesive layer 16. Any optical adhesive known in the liquid crystal display art may be used; typically, such adhesives are water-white, exhibit very high transmittance (preferably greater than about 90%) and are free of bubbles or other defects. Preferably, the adhesive will maintain these performance criteria after both heat and humidity aging (for instance, at 80° C. and 95% R.H. for 600 hours). An example of an optical adhesive is an acrylate-type adhesive commercially available as MC-2000™ or MC-2030™ Thin Precision-Engineered Double Coated Tapes from Permacel Division of Nitto Denko Co., Osaka, Japan. Each optical adhesive layer may be from about 25 to about 65 µm thick. The outermost layer of multilayer angularity enhancement construction 10 can comprise commercially-available polyethylene terephthalate (PET) release liner 18 externally adjacent to optical adhesive 16. Release liner 18 may be from about 25 to about 50 µm in thickness, preferably from about 25 to about 35 µm thick, and most preferably about 25 µm thick. The outermost layer of multilayer angularity enhancement construction 10 on the opposite side of central substrate 12 from release liner 18 can comprise protective layer 20, also a commercially-available material, preferably PET, preferably from about 25 to about 75 µm thick, more preferably from about 25 to about 50 µm thick, and most preferably about 25 µm thick.

Figure 2:
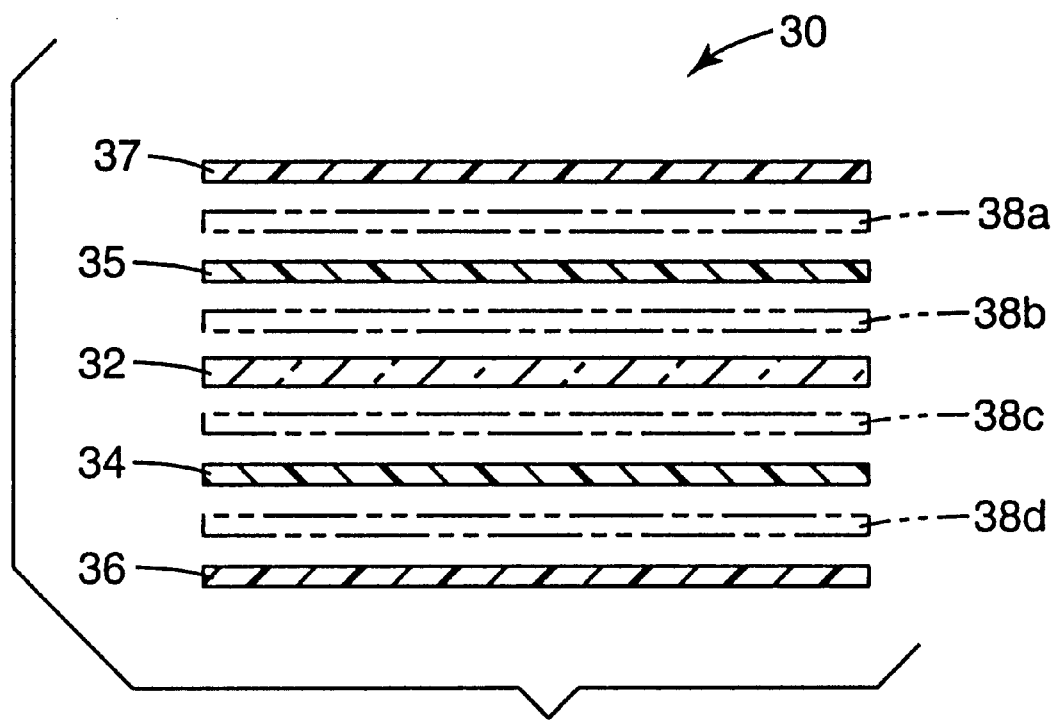
FIG. 2 represents a cross-sectional view of a liquid crystal display stack comprising at least one angularity enhancement layer of the invention.

More particularly, FIG. 2 shows a typical liquid crystal display (LCD) 30 in which angularity enhancement layers of the invention may be used. Centrally disposed in LCD 30 is a liquid crystal (LC) cell 32. In LCD 30, LC cell 32 has no internal angularity enhancement layers. When LC cell 32 is in the supertwisted nematic (STN) mode, optional retarder layers 34 and 35 are required in a typical LCD, disposed adjacent to and on either side of LC cell 32. Retarder layers are known in the liquid crystal display art, and typically may include uniaxially-or biaxially-oriented films comprising polyolefins, polystyrene, polycarbonate, and the like. A pair of polarizers 36 and 37 located outside of and immediately adjacent to retarder layers 34 and 35, when they are present, or, alternatively, immediately adjacent to and on either side of LC cell 32 when LC cell 32 comprises twisted nematic (TN) liquid crystal molecules. An angularity enhancement layer 38 of the invention can be disposed between any two layers of LCD 30, at sites 38a, 38b, 38c, or 38d. Preferably, the multilayer angularity enhancement construction is disposed directly adjacent to the liquid crystal cell. Preferably, angularity enhancement layer 38 comprises a multilayer angularity enhancement construction, as described in FIG. 1.

Polyimides of the invention, when included as a compensator layer in a liquid crystal display, provide for angularity enhancement of the viewing angle. Liquid crystal displays are useful in portable computer displays, digital watches, calculators, and in other types of electronic equipment where the need exists for compactness.

Objects and advantages of this invention are further illustrated by the following examples, but the particular materials and amounts thereof recited in these examples, as well as other conditions and details, should not be construed to unduly limit this invention.

Materials

In the following Examples, 9,9-bis(3-methyl-4-aminophenyl)fluorene (OTBAF) was prepared as described in U.S. Pat. No. 4,684,678, Example 2. It was recrystallized from anhydrous dichloroethane prior to use. p-Phenylenediamine (PDA) was obtained in a sublimed, zone-refined form from Aldrich Chemical Company. 2,5-Dimethyl(p-phenylenediamine) (DMPDA) was obtained from Aldrich and recrystallized from absolute ethanol prior to use. 4,4'-(1,4-Phenylenebis(1-methylethylidene)) bisbenzamine (EHPT) was obtained from Shell Chemical Company and was recrystallized from anhydrous dichloroethane prior to use. 9,9-Bis((3,5-dimethyl-4-amino)phenyl) fluorene (DM-OTBAF), 9,9-Bis[(3-ethyl-5-methyl-4-amino)phenyl)]flourene(DE-OTBAF), and 9,9-bis[(2,5-diethyl-4-amino)phenyl]fluorene (DEAF) were prepared analogously, but using a different aniline derivative, as OTBAF, and were recrystallized prior to use. 3,3'- 4,4'-Benzophenone tetracarboxylic acid dianhydride(BTDA) was purchased from Aldrich in a sublimed form. 4,4'-Oxydi (phthalic anhydride) (ODPA) was obtained from Occidental Chemical Company and purified via recrystallization from anisole. Pyromellitic dianhydride (PMDA), 2,2'-bis-((3,4-dicarboxyphenyl)hexafluoropropane dianhydride (6FDA), 3,3'-4,4'-biphenyltetracarboxylic dianhydride (s-BPDA), and DSDA (3,3'-4,4'-diphenyl sulfone tetracarboxylic acid dianhydride) were purchased and used as received from Chriskev Company of Leawood, Kans.

Polyimide Synthesis

The polyimides were synthesized following a modification of information disclosed in C. E. Sroog, Prog. Polym. Sci., 16, pp 561–694 (1991). The syntheses are disclosed in detail below.

Solubility

Evaluations of polymer solubility were performed by adding 0.15 g of polymer to 0.85 g of the appropriate solvent. Samples were placed in a shaker and evaluated after two days at room temperature.

| Procedure for GPC | |
|---|---|
| Sample: | 200 µL injection @ 10 mg/mL DMAC sample filtered through 0.45 µm membrane |
| Mobile Phase: | N,N-Dimethylacetamide; Burdick & Jackson or equivalent grade |
| Flow Rate: | 1.0 mL/min |
| Detector: | HP-1047-A Refractive Index, 40° C., Sensitivity = 32 |
| Columns: | 3 columns; 30 cm × 7.8 mm each 2-Phenogel ™ linear 1-UltraStyragel ™ linear columns are held at 40° C. |
| Standards: | polystyrene, narrow dispersity |

Film Fabrication

Polyimide solutions were prepared at 10–15% solids in DMAC. These were spread with a Gardner knife at a 300 micrometer (12 mil) blade gap onto a glass plate. Solvent removal was accomplished via vacuum-drying at 80° C. for a minimum of three hours.

Optical Measurements

The refractive index of polyimide films was selectively measured in the x, y, and z directions using a Metricon Prism Coupler. X and y are in the plane of the film and z is perpendicular to it. The measurements were made at either 568, 633, or 700 nm. All the films showed uniaxial type symmetry in which $n_x = n_y > n_z$. The birefringence is given by $\Delta n = n_x - n_z$, wherein n is value of the refractive index. The retardation $\delta$ imparted by these films to a polarized beam of light at angles of incidence other than the normal is given by Formula VI, above.

EXAMPLE 1

Homopolyimide

Polymer #2 in Table 1, below

OTBAF (60.0 g) and 2,2'-bis-(3,4-dicarboxyphenyl) hexafluoropropane dianhydride (6FDA), 96.6 g, were charged as powders directly into a one-liter reaction flask equipped with a mechanical stirrer, nitrogen inlet and bubbler, heating mantle, and temperature controller.

The reactor was sealed and 560 cc N,N-dimethylacetamide (DMAC) was added. Stirring was begun under a steady nitrogen purge. The resulting slurry was initially red, then yellow, then pale yellow as the monomers dissolved. After several hours of stirring at room temperature, a light yellow, viscous poly(amic acid) solution was obtained. After stirring for four hours, acetic anhydride (65.1 g) was added dropwise to the polyamic acid solution, followed by pyridine (44.1 g), also added dropwise. The reaction was heated to 120° C. and held for 45 minutes, then for one hour at 100° C. The resultant cyclized polyimide remained in solution throughout. The solution was cooled to room temperature overnight, and then the crude polyimide was coagulated by slowly pouring the DMAC solution into methanol, in a blender. The precipitated polymer was obtained by filtration onto a large, coarse-fritted Buchner funnel and washed with 8–12 liters (2–3 gallons) of methanol. This extensive washing was necessary to free the material of DMAC, pyridine, and other by-products. The washed polymer was then vacuum-dried at 60° C. overnight; the final product was a white powder. Molecular weight analyses via GPC (polystyrene standards) gave Mn=3.68× $10^4$, Mw=1.63×$10^5$, and P= 4.43, wherein Mn=number average molecular weight, Mw=weight average molecular weight, and P=polydispersity. Films of this material were prepared via solvent-coating from a variety of solvents.

EXAMPLE 2

Polymer #17 in Table 4, below

A 100-ml three-necked flask was placed under a nitrogen atmosphere and equipped with an overhead stirrer. The flask was charged with 0.34 g of DMPDA, 0.94 g of OTBAF and 2.22 g of 6FDA. Next, the flask was charged with 25 mL of DMAC. Initially, the reaction temperature was kept at room temperature with a water bath. The solution viscosity increased as the reaction was stirred overnight at room temperature. Next, the reaction was charged with 2.0 mL of acetic anhydride and 1.8 mL of pyridine. The mixture was heated at 105–110°C. for two hours and cooled to room temperature. The polymer was coagulated with methanol in a blender and then filtered. The white solid thus obtained was resuspended in methanol, filtered, and dried under vacuum (30 mm Hg) at 50° C. to yield 2.8 g of a white powder. (Tg=367° C.; Mn=7.6×$10^4$; Mw=5.34×$10^5$.)

Using the procedures described above for preparing homopolyimides and copolyimides of the invention, 30 polyimides described below in Tables 1 through 8 were produced. Ratios of polymer components were 1:1 unless otherwise stated. Birefringence and color data of the polyimides produced are included in the Tables. Table 8, below, shows solubility data for samples 1 to 30 of Tables 1–7.

TABLE 1

OTBAF-Derived Polyimides. Birefringence Measurements and Color[a]

| Polymer # | Structure | Δn (632.8 nm) | Color |
|---|---|---|---|
| 1. | OTBAF[b] — ODPA[c] | −0.0078 | ww |
| 2. | OTBAF — 6FDA[d] | −0.0099 | ww |

TABLE 1-continued

OTBAF-Derived Polyimides. Birefringence Measurements and Color[a]

| Polymer # | Structure | Δn (632.8 nm) | Color |
|---|---|---|---|
| 3. | 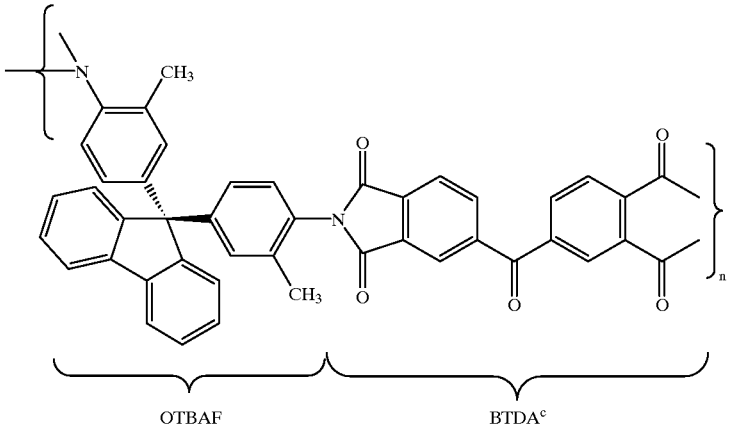 OTBAF — BTDA[c] | −0.0107 | s |
| 4. | 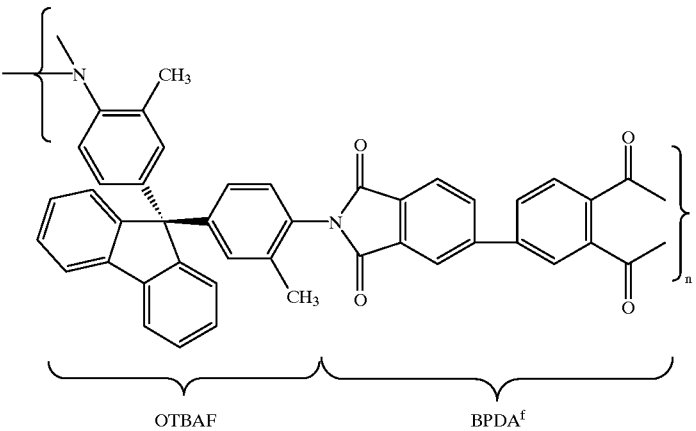 OTBAF — BPDA[f] | −0.0118 | y |

[a]color: ww = water-white colorless; s = slightly yellow; y = yellow,
[b]OTBAF = 9,9-bis(3-methyl-4-aminophenyl)fluorene;
[c]ODPA = 4,4'-oxydiphthalic anhydride;
[d]6FDA = 2,2'-bis-(3,4-dicarboxyphenyl)hexafluoropropane dianhydride;
[e]BTDA = 3,3'-4,4'-benzophenone tetracarboxylic acid dianhydride;
[f]s-BPDA = 3,3'-4,4'-biphenyltetracarboxylic dianhydride Optical measurement data of Table 1 show that polyimides 1–4 were negatively birefringent.

TABLE 2
Polyimides Based on OTBAF Analogs. Birefringence Data
| Polymer # | Structure | Δn (λ, nm) | Color |
|---|---|---|---|
| 5. | 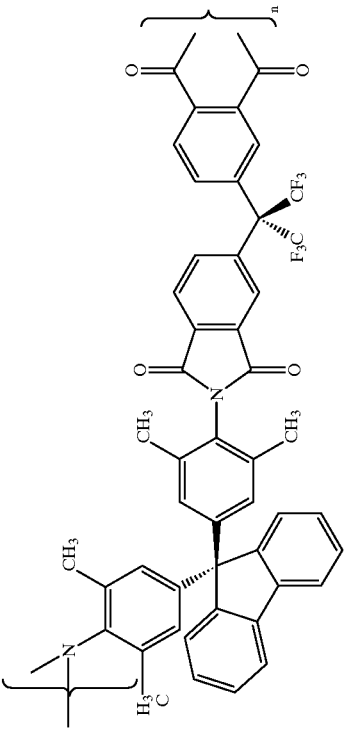 DM-OTBAF[g] — 6FDA | -0.0075 (700) | ww |
| 6. | 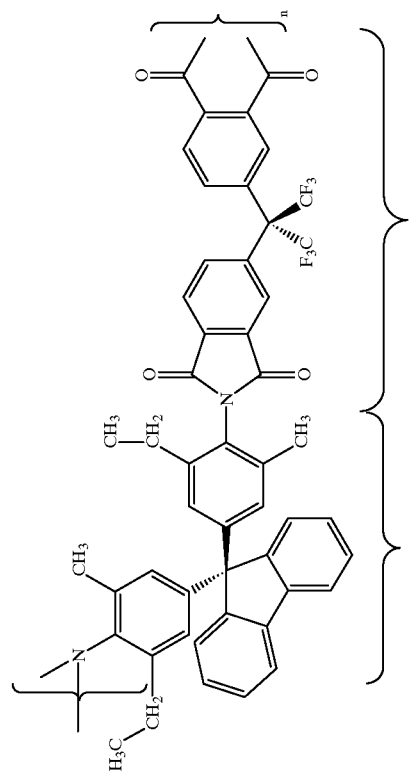 DE-OTBAF[h] — 6FDA | -0.0050 (700) | s |

TABLE 2-continued
Polyimides Based on OTBAF Analogs. Birefringence Data
| Polymer # | Structure | Δn (λ, nm) | Color |
|---|---|---|---|
| 7. | 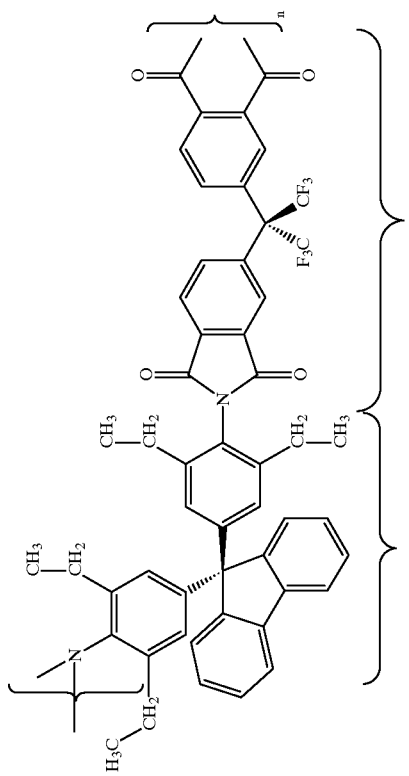 | −0.0039 (700) | y |
[g]DM-OTBAF = 9,9-bis((3,5-dimethyl-4-amino)phenyl)fluorene
[h]DE-OTBAF = 9,9-bis((3-ethyl-5-methyl-4-aminophenyl)fluorene
[i]DEAF = 9,9-bis(3,5-diethyl-4-aminophenyl)fluorene Substituted analogs of OTBAF were polymerized with 6FDA. The data showed these polyimides had negative birefringence values.

TABLE 3

Copolyimides with Dianhydride Variation. Birefringence Data

| Polymer # | Structure | Dianhydride, mol % | | | Δn (λ, nm) | Color |
| --- | --- | --- | --- | --- | --- | --- |
| | | PMDA | 6FDA | BPDA | | |
| 8. | | 15 | 35 | 0 | −0.0078 (700) | y |
| 9. | | 25 | 25 | 0 | −0.0089 (700) | y |

TABLE 3-continued

Copolyimides with Dianhydride Variation. Birefringence Data

| Polymer # | Structure | Dianhydride, mol % | | | Δn (λ, nm) | Color |
| --- | --- | --- | --- | --- | --- | --- |
| | | PMDA | 6FDA | BPDA | | |
| 10. | [structure: 6FDA / OTBAF / BPDA] | 0 | 25 | 25 | −0.0132 (700) | s | iPMDA = pyromellitic dianhydride

Copolyimides based on various dianhydrides were synthesized. The data of Table 3 show that incorporation of the linear PMDA or BPDA enhanced the negative birefringence (relative to polymer 1, for example). Slightly colored or yellow polymer film resulted due to the greater conjugation lengths present in the polymer structures. These polymers of Table 3 exhibited a range of solubilities (polymer 8 being most soluble) as shown in Table 8.

TABLE 4

Copolyimides with Diamine Variations. Birefringence Data*

| Polymer # | Structure | Diamine, mol % | | | Δn (λ, nm) | Color |
| --- | --- | --- | --- | --- | --- | --- |
| | | OTBAF | PDA | DMPDA[1] | | |
| 11. | | 35 | 15 | | −0.0223 (568) | ww |
| 12. | | 25 | 25 | | −0.0214 (633) | ww |
| 13. | | 15 | 35 | | −0.0233 (633) | ww |
| 14. | | 7.5 | 42.5 | | −0.0315 (633) | s |

TABLE 4-continued

Copolyimides with Diamine Variations. Birefringence Data*

| Polymer # | Structure | Diamine, mol % | | | Δn (λ, nm) | Color |
|---|---|---|---|---|---|---|
| | | OTBAF | PDA | DMPDA[1] | | |
| 15. | | 42.5 | | 7.5 | −0.0124 (633) | ww |
| 16. | | 35 | | 15 | −0.0141 (633) | ww |
| 17. | | 25 | | 25 | −0.0213 (633) | ww |
| 18. (comparative) | | 0 | | 50 | −0.0386 (633) | ww |

[k]PDA = p-phenylene diamine
[l]DMPDA = 2,5-dimethyl(p-phenylenediamine)
*all polymers contained 50 mol percent 6FDA Polymers of Table 4 were designed with linear diamine segments. Copolymers with PDA (samples 1–14) and with DMPDA (samples 15–17) had birefringence values particularly useful for applications as angularity enhancement films. All materials were colorless or slightly colored and possessed adequate solubilities (see Table 8, below), some even in MEK (methyl ethyl ketone), a particularly desirable solvent for coating of polyimides. Dispersion data for Polymer 17 are shown in Table 10 and show the variance of delta n with wavelength ($\lambda$). This relationship provided optical information of key importance for applications in liquid crystal displays. Liquid crystal layers also show a variance of delta n with $\lambda$. These polyimide films show the ability to compensate liquid crystal cells. It is important to note that isotropic polymers such as polypropylene show no change of delta n with $\lambda$.b. Polymers 12 and 17 of this group were particularly useful for coating and optical applications because of the beneficial combination of solubility in MEK, water-white clarity, and useful negative birefringence.

TABLE 5

OTBAF/EHPT Copolyimides, Birefringence Data*

| Polymer # | Structure | Diamine, mol % | | | Δn (λ,nm) | Color |
|---|---|---|---|---|---|---|
| | | OTBAF | EHPT | 6FDA | | |
| 19. | | 35 | 15 | | −0.0013 (633) | s |
| 20. | | 25 | 25 | | −0.0135 (700) | ww |
| 21. | | 15 | 35 | | −0.0069 (633) | ww |
| 22. (comparative) | | | 50 | | −0.0167 (700) | s |

ᵐEHPT = 4,4′-(1,4-phenylenebis(1-methylethylidene))bisbenzeneamine
*all polymers contained 50 mol percent 6FDA Table 5 shows data for copolymers involving a nonlinear diamine, EHPT. This diamine was expected to provide solubility due to the isopropylidene groups, and perhaps some chain stiffness as well. Polymers 19–22 were less useful because of lower birefringence values, but were quite soluble (Table 8), some even in toluene and propylene glycol methyl ether acetate.

TABLE 6
Polyimides Incorporating More Than Three Monomers
| Polymer # | Structure | DSDA* | OTBAF | 6FDA | DMPDA | Δn (700 nm) | Color |
|---|---|---|---|---|---|---|---|
| 23. | | 50 | 50 | — | — | −0.0074 | s |
| 24. | | 25 | 7.5 | 25 | 42.5 | −0.0277 | ww |
| 25. | | 35 | 7.5 | 15 | 42.5 | −0.0293 | ww |
| 26. | | 50 | 25 | — | 25 | −0.0093 | s |
| 27. | | 25 | 25 | 25 | 25 | −0.0151 | ww |
| 28. | | 25 | 50 | 25 | — | 0.0083 | s |
*DSDA = 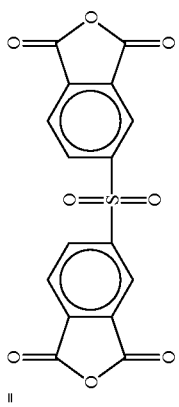

The data of this Table show that copolyimides with more than two types of repeating units are useful in this invention.

TABLE 7

Fluorene Dianiline-Derived Polyimides

| Polymer # | Structure | Monomer mol % | | | Δn (700 nm) | Color |
|---|---|---|---|---|---|---|
| | | FDA* | 6FDA | PDA | | |
| 29. | | 50 | 50 | — | −0.0097 | s |
| 30. | | 25 | 50 | 25 | −0.0200 | y |

*FDA = fluorene dianiline

The data of this Table show that replacement of an ortho-alkyl group, particularly methyl, of Samples 11–14 with a hydrogen atom increases the color of the resulting birefringent layer, decreases birefringence, and reduces solubility.

TABLE 8

Optical Polyimide Solubility Data[1,2]

| Sample # | DMAC | DMF | CYCLO | DIOX | NMP | MEK | TOL | PGA |
|---|---|---|---|---|---|---|---|---|
| 1 | S | S | G | S | S | I | I | I |
| 2 | S | S | G | S | S | G | I | G |
| 3 | S | S | S/G | S | S | I | I | I |
| 4 | G | G | I | G | S | I | I | G |
| 5 | G | S | G | I | G | I | I | G |
| 6 | S | S | S | G | I | I | I | G |
| 7 | S | G | G | G | S | I | I | I |
| 8 | S | S | S | S | S | S | I | S |
| 9 | S/G | S/G | G | S/G | S/G | I | I | I |
| 10 | S | S | S | S | S | I | I | G/I |
| 11 | S | S | G | G | S | S | I | S |
| 12 | S | S | G | G | S | S | I | S |
| 13 | S | S | I | G | S | I | I | I |
| 14 | S | I | I | I | S | I | I | I |
| 15 | S | S | S | S | S | S | I | G |
| 16 | S | S | S | S | S | S | S | G |
| 17 | S | G | S | G | G | S | I | G |
| 18 | S | G | I | G | G | S | I | I |
| 19 | S | S | S | S | S | S | G | S |
| 20 | S | S | S | S | S | S | S | S |
| 21 | S | S | S | S | S | S | G | S |
| 22 | S | S | S | S | S | S | S | — |
| 23 | S | S | S | S | S | I | I | I |
| 24 | S | S | S | S | S | I | I | I |
| 25 | S | S | G | G | S | I | I | I |
| 26 | S | S | S | S | S | I | I | I |
| 27 | S | S | S | S | S | S | I | I |
| 28 | S | S | S | S | S | I | I | I |
| 29 | S | S | S | S | S | S | I | I |
| 30 | S | G | G | G | S | G | I | I |

[1]DMAC = N,N-dimethylacetamide;
DMF = N,N-dimethylformamide;
CYCLO = cyclohexanone;
DIOX = dioxane;
NMP = N-methylpyrrolidinone;
MEK = methyl ethyl ketone;
TOL = toluene;
PGA = propylene glycol methyl ether acetate.
[2]S = soluble;
G = forms a gel;
I = insoluble

EXAMPLE 3

Film Construction

Polymer #17 in Table 4, above

The polyimide polymer #17 (OTBAF:6FDA:DMPDA= 25:50:25 molar ratios) was dissolved in methyl ethyl ketone (MEK):cyclohexanone (5.5:1 vol:vol) at 13% solids. The solution was reverse-microgravure coated onto 0.075 mm (3 mil) poly(methyl methacrylate) (PMMA) film using a Yasui-Seiki microgravure coater (Yasui-Seiki Co., Kanagawa, Japan); knurl rolls of 70R and /or 110R were used for each sample ("R" indicates that the roll is Right-helical in configuration). The web-speed-to-roll linear ratio was set at a value of 1 and oven temperature at 80° C.. Three coatings were applied alternatingly to each side of the PMMA film, with oven drying in between each coat. One side was coated 3 times using the #70R knurl roll; the other side was coated twice with the #70R roll followed by once with the #110R roll. The combined thickness of the six coated layers (excluding the PMMA substrate) was approximately 11 micrometers.

One plastic liner was removed from a piece of Permacel™ MC-2000 double-coated tape (Nitto Denko Co., Osaka, Japan) and the exposed adhesive surface was applied to one side of the coated sample. Lamination was completed by placing the construction on a hard surface, polyimide-face down and applying pressure to the remaining plastic liner of the tape by a 5 cm wide hard rubber laboratory hand roller using firm hand pressure. The remaining plastic liner was then removed and the adhesive layer (thus exposed) was laminated to a glass plate for subsequent examination of the sample.

The coated sample was examined to determine viewing angle (i.e., off-normal angle) dependence on retardation. The 4×4 matrix method of Berreman (*J.Opt. Soc. Am.*, 62, 502 (1972)) was used to calculate the estimated angular dependence of the retardation based upon the measured values of the thickness and the refractive indices in the x, y and z directions; x and y being in the plane of the film and z in the thickness direction. Table 9 below compares measured retardation to that calculated from the 4×4 matrix method.

TABLE 9

Retardation Dependence on Angle of Inicidence

| Viewing Angle | Retardation, $\delta_p - \delta_s$ | |
|---|---|---|
| | Calculated | Observed |
| 0 | 0.00 | 0.00 |
| 10 | −2.72 | −3.12 |
| 20 | −10.75 | −10.41 |
| 30 | −23.65 | −23.71 |
| 40 | −40.61 | −40.64 |
| 50 | −60.26 | −60.17 |
| 60 | −80.58 | −78.19 |

The coated sample was examined to determine birefringence, $\Delta n$, as a function of the wavelength of impinged light, where birefringence was calculated according to formula VIII:

$$\Delta n = n_x - n_z \qquad \text{VIII}$$

wherein $n_z$ represents the refractive index of the layer measured perpendicular to the plane of the layer; and $n_x$ represents the refractive index of the layer measured parallel to the plane of the layer. The dependence of $\Delta n$ on wavelength, referred to as a dispersion curve, is shown in Table 10, below.

The agreement between measured retardation from transmittance and that calculated from the 4×4 matrix showed homogeneity of the film throughout its thickness (no 'skin' effect). The angular dependence of retardation (Table 9) showed that the inventive films were capable of compensating for the ellipticity induced by liquid crystals at off-normal angles. In other words, this effect enhanced the viewing characteristics of LC displays at off-normal angles.

TABLE 10

Dependence of Birefringence on Wavelength
(Dispersion Curve)

| λ, nm | Δn |
|---|---|
| 488 | 0.0213 |
| 568 | 0.0199 |
| 700 | 0.0184 |

The data of Table 10 show that, for angularity enhancement layers of the invention, there was a distinct dependence of birefringence on wavelength of light. This is important because liquid crystal cells also show a variance of Δn with wavelength. It is also important that the dispersing curves of the birefringence of the liquid crystal and the polyimide birefringent layer match.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A liquid crystal display comprising an angularity enhancement construction and a liquid crystal cell, said angularity enhancement construction including a polyimide layer comprising the reaction product of a 9,9-bis(aminoaryl)fluorene, one or more aromatic tetracarboxylic acid dianhydrides, and optionally at least one of different aromatic diamines and monofunctional monomeric encapping agents, wherein said polyimide comprises 50 mol percent 2,2'-bis(3,4-dicarboxyphenyl)hexafluoro-propane dianhydride, 25 mol percent 9,9-bis(3-methyl-4-aminophenyl)fluorene, and 25 mol percent of at least one of p-phenylenediamine and 2,5-dimethyl-p-phenylenediamine.

* * * * *